(12) United States Patent
Mohamed et al.

(10) Patent No.: US 11,801,553 B1
(45) Date of Patent: Oct. 31, 2023

(54) METHOD FOR MAKING CARBON-COATED COPPER NANOPARTICLES

(71) Applicant: KING FAISAL UNIVERSITY, Al-Ahsa (SA)

(72) Inventors: Osama Saber Yehya Mohamed, Al-Ahsa (SA); Mostafa Osama Saber, Al-Ahsa (SA); Aya Osama Saber, Al-Ahsa (SA); Doaa Osama Saber, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/071,476

(22) Filed: Nov. 29, 2022

(51) Int. Cl.
*B22F 1/02* (2006.01)
*B22F 1/054* (2022.01)
*B22F 1/06* (2022.01)
*B22F 9/30* (2006.01)
*B82Y 40/00* (2011.01)

(52) U.S. Cl.
CPC .............. *B22F 1/054* (2022.01); *B22F 1/06* (2022.01); *B22F 9/30* (2013.01); *B22F 2201/11* (2013.01); *B22F 2202/03* (2013.01); *B22F 2203/11* (2013.01); *B22F 2203/13* (2013.01); *B22F 2301/10* (2013.01); *B22F 2302/40* (2013.01); *B22F 2303/01* (2013.01);
(Continued)

(58) Field of Classification Search
None
See application file for complete search history.

(56) References Cited

U.S. PATENT DOCUMENTS

2008/0220244 A1\* 9/2008 Wai .................. B01J 21/185
427/230
2010/0266846 A1\* 10/2010 Kim .................. C22C 19/03
75/363
(Continued)

FOREIGN PATENT DOCUMENTS

CN 102806356 A 12/2012
CN 107755691 A 3/2018
(Continued)

OTHER PUBLICATIONS

Li, J. et al., "Synthesis and surface plasmon resonance properties of carbon-coated Cu and Co nanoparticles", Materials Research Bulletin, vol. 46, pp. 743-747, Available online Jan. 26, 2011.\*
(Continued)

*Primary Examiner* — George Wyszomierski
(74) *Attorney, Agent, or Firm* — Nath, Goldberg & Meyer; Richard C. Litman (57) ABSTRACT

The method for making carbon-coated copper nanoparticles is a simple, one-step for coating copper nanoparticles with a carbon shell to prevent rapid oxidation of the carbon nanoparticle core. The method involves heating or autoclaving thin sheets of copper hydroxide nitrate ($Cu_2(OH)_3NO_3$) under supercritical conditions (a temperature of 300° C. and a pressure of 120 bar) for two hours. The autoclaving may be performed in the presence of an inert gas, such as argon, which may be used to remove any remaining gases, and the pressure may be released in the presence of the inert gas so that the product may be collected in the presence of air.

7 Claims, 7 Drawing Sheets

(52) U.S. Cl.
CPC ....... *B22F 2304/05* (2013.01); *B22F 2998/10* (2013.01); *B82Y 40/00* (2013.01)

(56) References Cited

U.S. PATENT DOCUMENTS

2015/0202598 A1* 7/2015 Kallesoe .................. B01J 21/18
502/185
2018/0297121 A1 10/2018 Harold et al.

FOREIGN PATENT DOCUMENTS

| CN | 108906048 A | 11/2018 |
| --- | --- | --- |
| CN | 111872407 A | 11/2020 |
| CN | 113235113 A | 8/2021 |
| CN | 114559033 A | 5/2022 |

OTHER PUBLICATIONS

Sun et al., "A surfactant-free strategy for controllable growth of hierarchical copper oxide nanostructures", CrystEngComm (2013), vol. 26 (Abstract only).

Zeng et al., "Synthesis of copper nanoparticles using copper hydroxide", 19th International onference on Electronic Packaging Technology (2018) (Abstract only).

Li et al., "Carbon-coate copper nanoparticles: synthesis, characterization and optical properties", New Journal of Chemistry (2009) (Abstract only).

* cited by examiner

METHOD FOR MAKING CARBON-COATED COPPER NANOPARTICLES

BACKGROUND

1. Field

The disclosure of the present patent application relates to copper nanoparticles, and particularly to a method for making carbon coated copper nanoparticles by a single step method.

2. Description of the Related Art

In recent years, there has been considerable interest in replacing noble metal nanoparticles (such as gold nanoparticles) in electrical, optical, and catalytic applications with nanoparticles made from less expensive materials, such as copper nanoparticles. A problem with this approach is that bare copper nanoparticles will be oxidized in a matter of a few hours when exposed to air at room temperature. A solution to this problem is coating the copper nanoparticles with a layer or shell of carbon. The carbon shell shields the copper nanoparticle core from oxidation. However, current techniques for coating a copper nanoparticle core with a carbon shell use two-step or three-step methods, which are time-consuming, prone to error, and potentially difficult and expensive. Thus, a method for making carbon-coated copper nanoparticles solving the aforementioned problems is desired.

SUMMARY

The method for making carbon-coated copper nanoparticles is a simple, one-step for coating copper nanoparticles with a carbon shell to prevent rapid oxidation of the carbon nanoparticle core. The method involves heating or autoclaving thin sheets of copper hydroxide nitrate ($Cu_2(OH)_3NO_3$) under supercritical conditions (a temperature of 300° C. and a pressure of 120 bar) for two hours. The autoclaving may be performed in the presence of an inert gas, such as argon, which may be used to remove any remaining gases, and the pressure may be released in the presence of the inert gas so that the product may be collected in the presence of air.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The method for making carbon-coated copper nanoparticles is a simple, one-step for coating copper nanoparticles with a carbon shell to prevent rapid oxidation of the carbon nanoparticle core. The method involves heating or autoclaving thin sheets of copper hydroxide nitrate ($Cu_2(OH)_3NO_3$) under supercritical conditions (a temperature of 300° C. and a pressure of 120 bar) for two hours. The autoclaving may be performed in the presence of an inert gas, such as argon, which may be used to remove any remaining gases, and the pressure may be released in the presence of the inert gas so that the product may be collected in the presence of air.

The method will be better understood with reference to the following examples.

Example 1

Preparation of Copper Hydroxide Nitrate

Copper monooxide (cupric oxide) and copper nitrate hydrate ($Cu(NO_3)_{2-x}H_2O$) were supplied from Sigma-Aldrich Company. Copper hydroxyl nitrate (essentially two molecules of copper hydroxide nitrate) was prepared by adding copper (II) oxide (CuO) (0.2 mol; Mol. wt.=79.55 g/mol and purity ≥99.0%) to 200 ml of an aqueous solution of copper nitrate hydrate (1.25M; Mol. Wt. 187.56 g/mol and purity ≥99.999%) with vigorous stirring followed by heating the resultant mixture at 90° C. for 12 h with stirring. The reaction was performed under flow of argon gas. The resultant greenish-blue solid was washed with distilled water and then washed with alcohol many times. After filtration, the greenish-blue precipitate was dried at room temperature under vacuum for two days.

Example 2

Preparation of Carbon-Coated Copper Nanoparticles

An appropriate amount of copper hydroxide nitrate ($Cu_2(OH)_3NO_3$) (15.4 g, prepared as described in Example 1, above) was mixed with 150 ml of ethanol. Then, the mixture was placed in a pressurized vessel equipped with a temperature controller unit. The thermal process of the solid was achieved under super critical conditions (temperature=300° C. and pressure=120 bar) for 2 h. After the thermal process, the pressure was released in the presence of an inert gas (Argon), which was used during the autoclave fluxing process to remove any remaining gases. The product was collected in the presence of air.

Example 3

Characterization of Copper Starting Material

Figure 1:
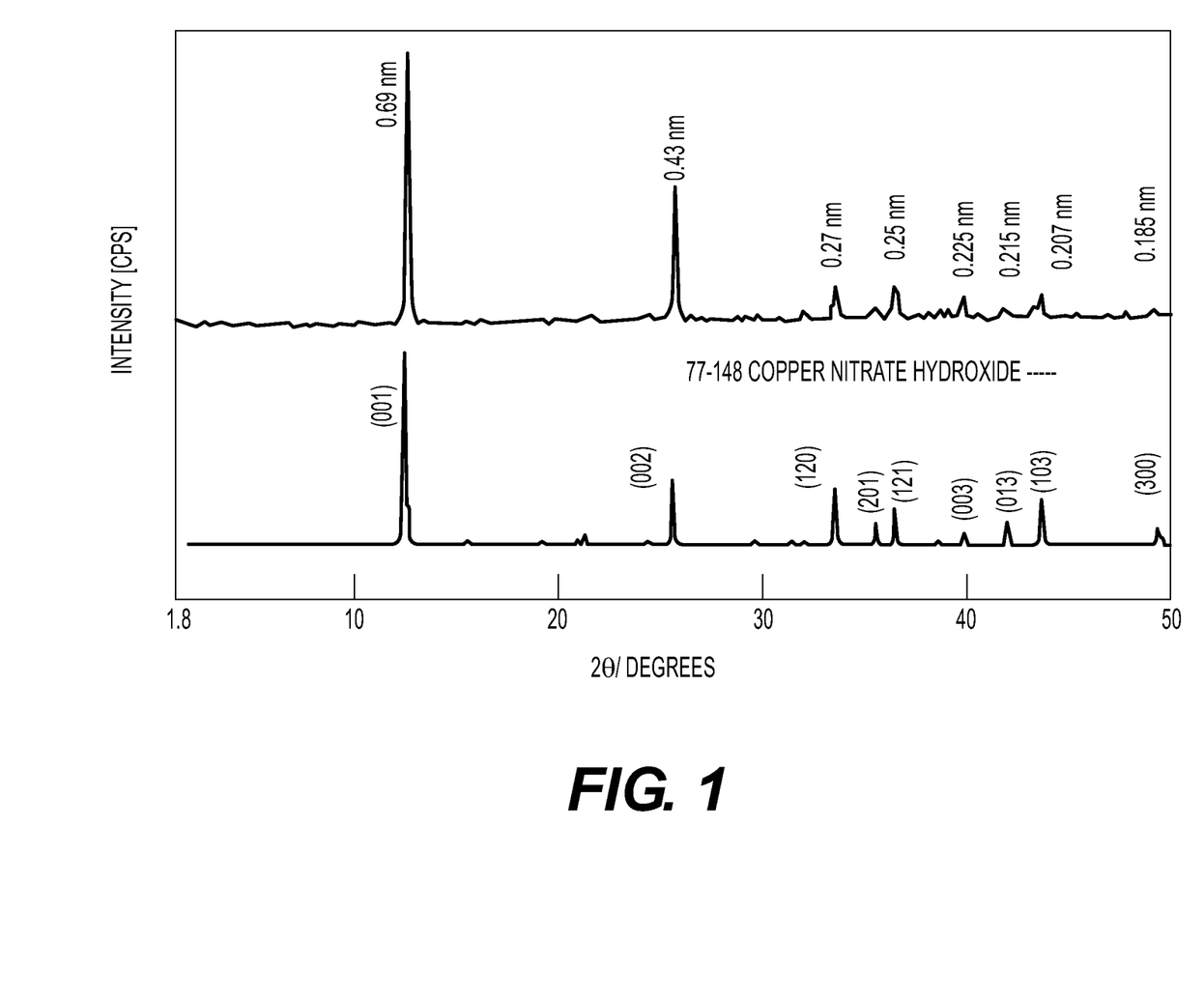
FIG. 1 is a composite X-ray diffractogram (XRD) comparing the copper hydroxyl nitrate ($Cu_4(OH)_6(NO_3)_2$) used in the experiments with a diffractogram tracing of JCPDS 77-0148.

The powder X-ray diffraction technique (XRD) has used to identify the crystalline structure of the raw material, as shown in FIG. 1. FIG. 1 shows the characteristic peaks of copper hydroxyl nitrate ($Cu_4(OH)_6(NO_3)_2$) agreeing with JCPDS 77-0148. The high and weak angles of 2-theta are clear at 12.87°, 25.86°, 33.7°, 35.74°, 36.57°, 40.0°, 42.08°, 43.750 and 49.36°. These peaks are agreed with the d-spacing at 0.69 nm, 0.344 nm, 0.27 nm, 0.25 nm, 0.225 nm, 0.215 nm, 0.207 nm and 0.15 nm, respectively. Also, these peaks are due to the reflections of the planes [001], [002], [120], [201], [121], [003], [013], [103] and [300], respectively.

Example 4

Characterization of the Prepared Carbon-Coated Copper Nanoparticles

Figure 2:
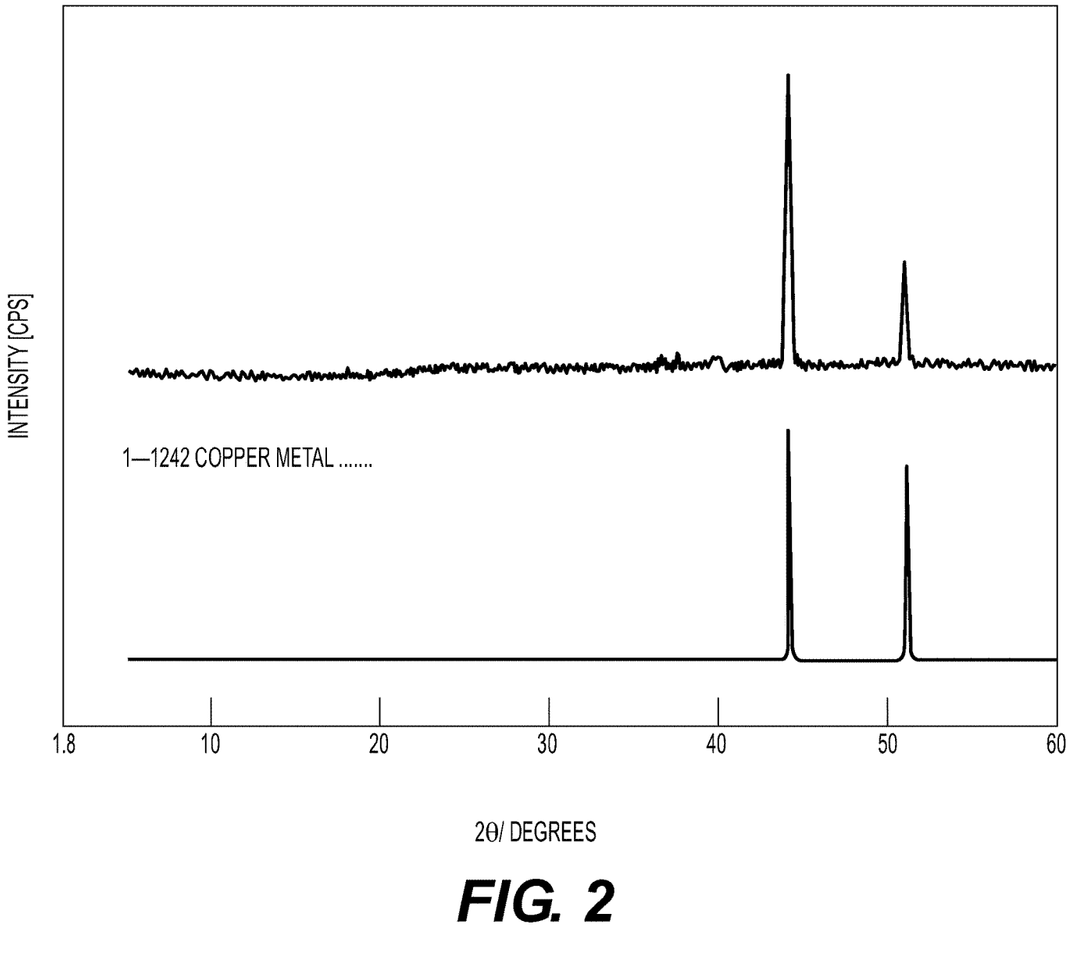
FIG. 2 is a composite XRD comparing the experimental carbon-coated copper nanoparticles with a diffractogram tracing of JCPDS 1-1242 for face-centered cubic copper.

X-ray diffraction (XRD) pattern of the resultant particles from the thermal process of Example 1 showed disappearance of the peaks of copper hydroxide nitrate, as shown in FIG. 2. At the same time, FIG. 2 revealed two sharp diffraction peaks located at 2θ=43.200 and 50.30°, as shown in FIG. 2. These two peaks correspond to the two crystalline planes of (111) and (200) of the face-centered cubic copper (JCPDS 1-1242), respectively.

The obviously broadened diffraction peaks suggest that the resultant nanoparticles should have a very small crystallite size. An average crystallite size of about 50 nm for the Cu nanoparticles was calculated by using the Scherer's relation. Also, three weak peaks were observed and located at 2θ=35.5, 36.5 and 38.7°. These weak peaks can suggest the presence of traces of CuO and $Cu_2O$.

Figure 3:
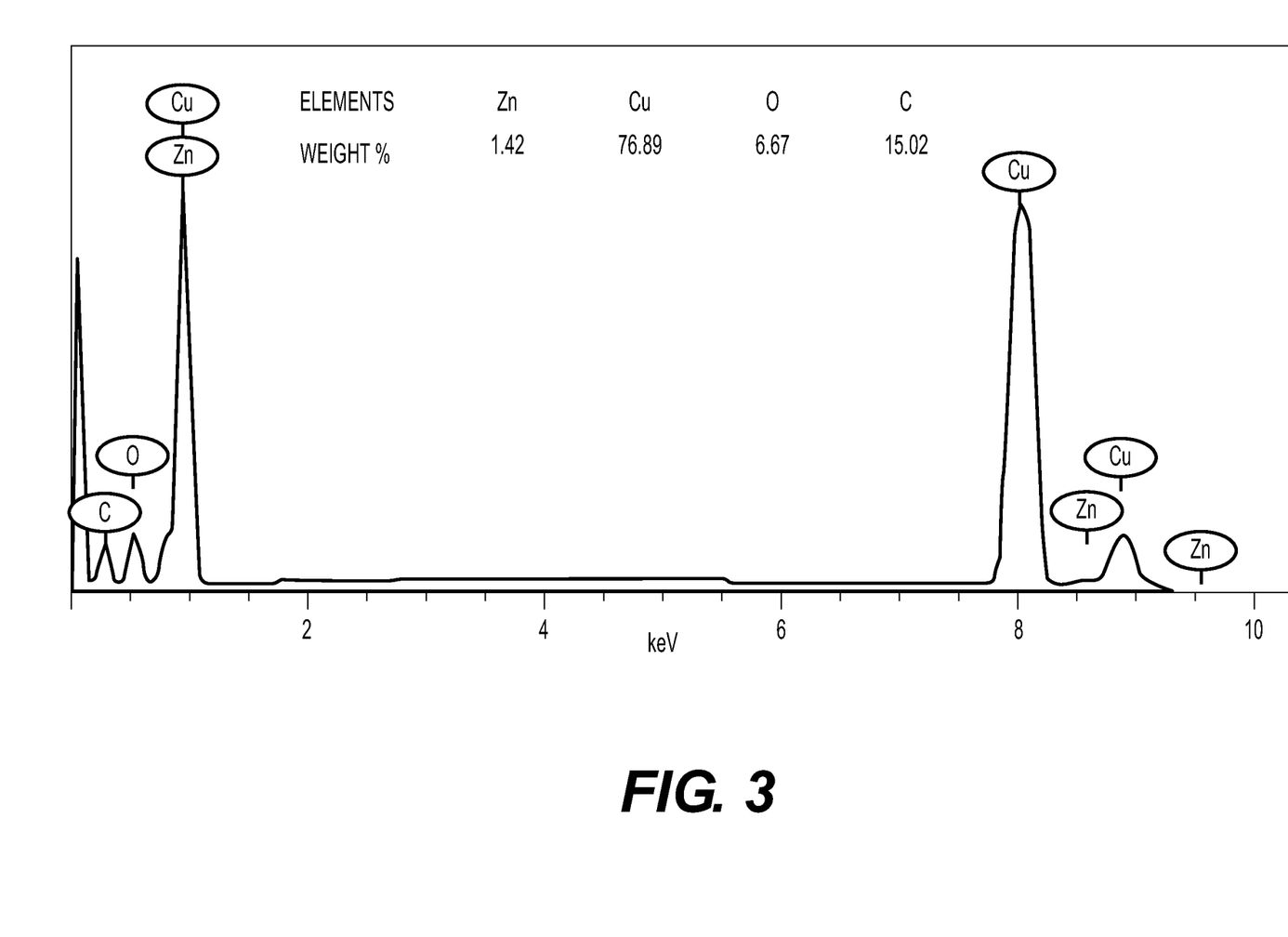
FIG. 3 is an Energy Dispersive X-ray (EDX) spectrum of carbon-coated copper nanoparticles prepared according to the present method.

The EDX analysis shown in FIG. 3 confirmed the presence of copper metal (76.89%), in addition to traces of oxygen (less than 6.67). Also, it showed the presence of carbon (15.02%), indicating that the copper metal was protected by thin layers of carbon. The peak of zinc is due to the substrate of the sample.

Figure 4A:
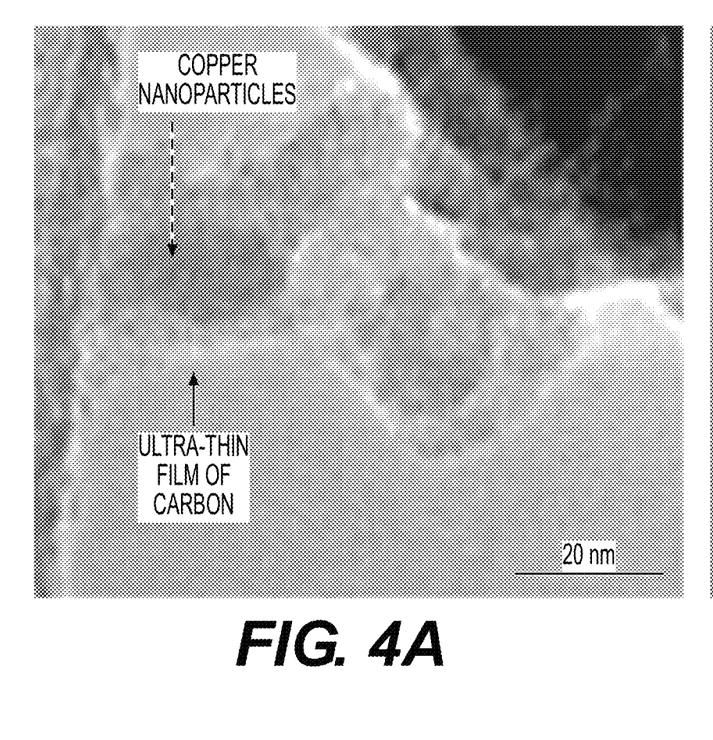
FIGS. 4A and 4B are TEM micrographs of carbon-coated copper nanoparticles prepared according to the present method.
Figure 4B:
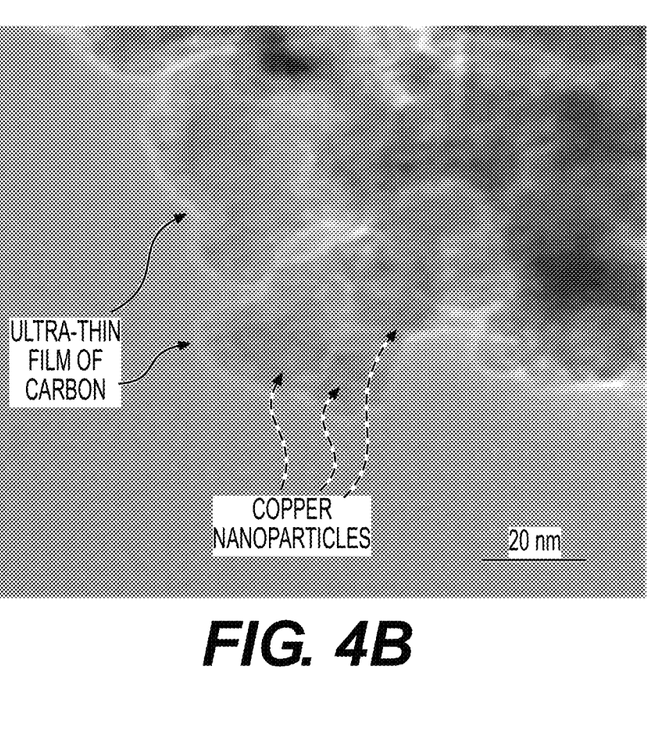

The TEM images in FIGS. 4A and 4B show that nanoparticles of copper are coated by ultra-thin films of carbon. The TEM images also indicated that the average size of the nanoparticles was around 20 nm, as shown in FIGS. 4A, 4B. Also, FIGS. 4A, 4B revealed that the carbon-coated layer around the nanoparticles is around 4 nm in thickness.

Figure 5:
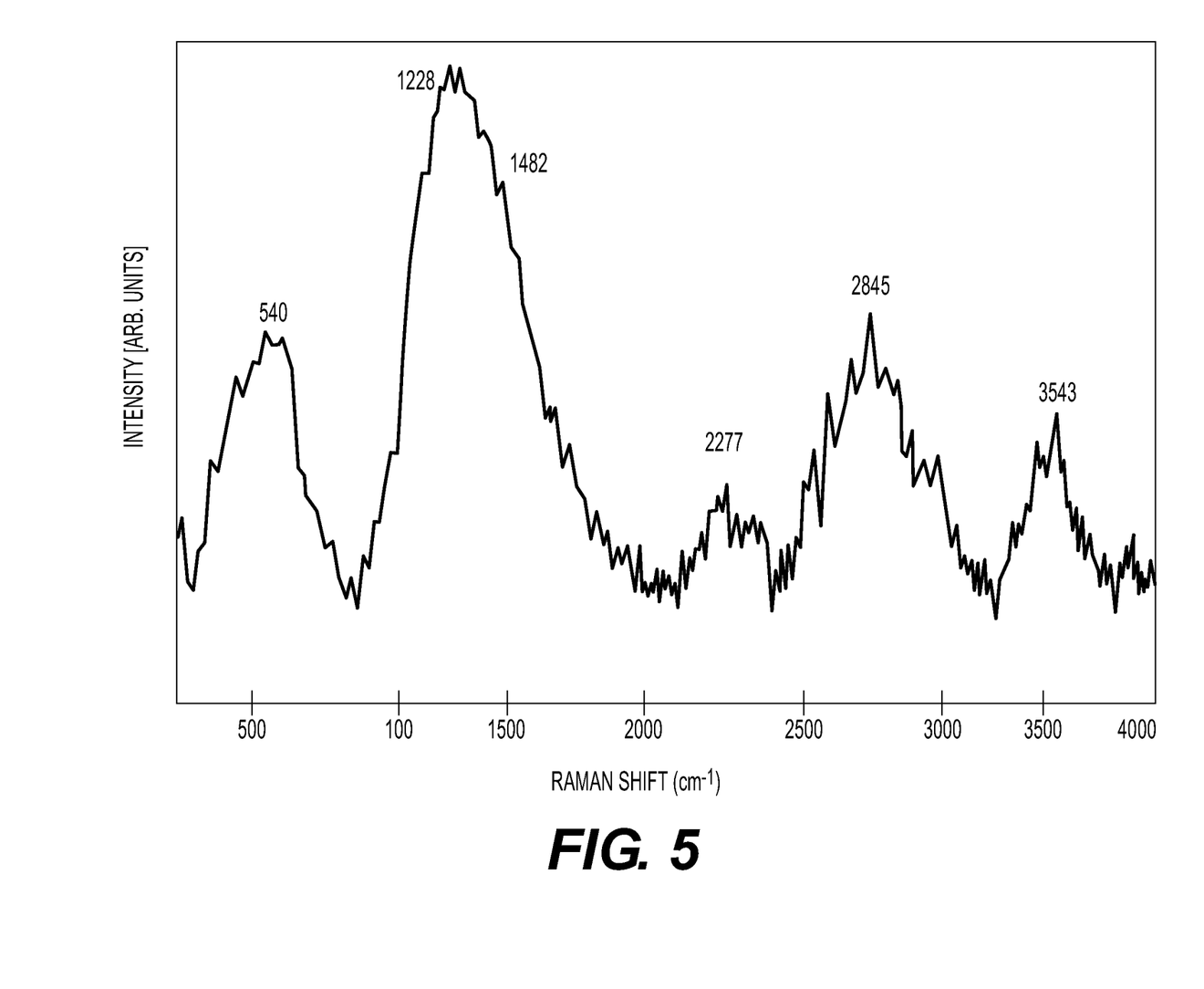
FIG. 5 is a Raman spectrum of carbon-coated copper nanoparticles prepared according to the present method.

In the Raman spectrum of the sample, the main band was observed at 1228 $cm^{-1}$, as shown in FIG. 5. It arises from defects in the hexagonal $sp^2$ carbon network and is called the D band. The other band, which is observed at 1482 $cm^{-1}$, is due to the stretching motion of $sp^2$ carbon pairs in both rings and chains and is called the G band. The positions of the D and G bands and their broadness can reflect and confirm the presence of a thin layer of amorphous carbon. Also, several combination bands located at 2277 $cm^{-1}$, 2845 $cm^{-1}$ and 3543 $cm^{-1}$ can be observed in the Raman spectrum. These bands are consistent with those of non-planar graphene, and can been assigned to a combination between the D and G bands.

Example 5

Thermal Stability of the Prepared Carbon-Coated Copper Nanoparticles

Figure 6:
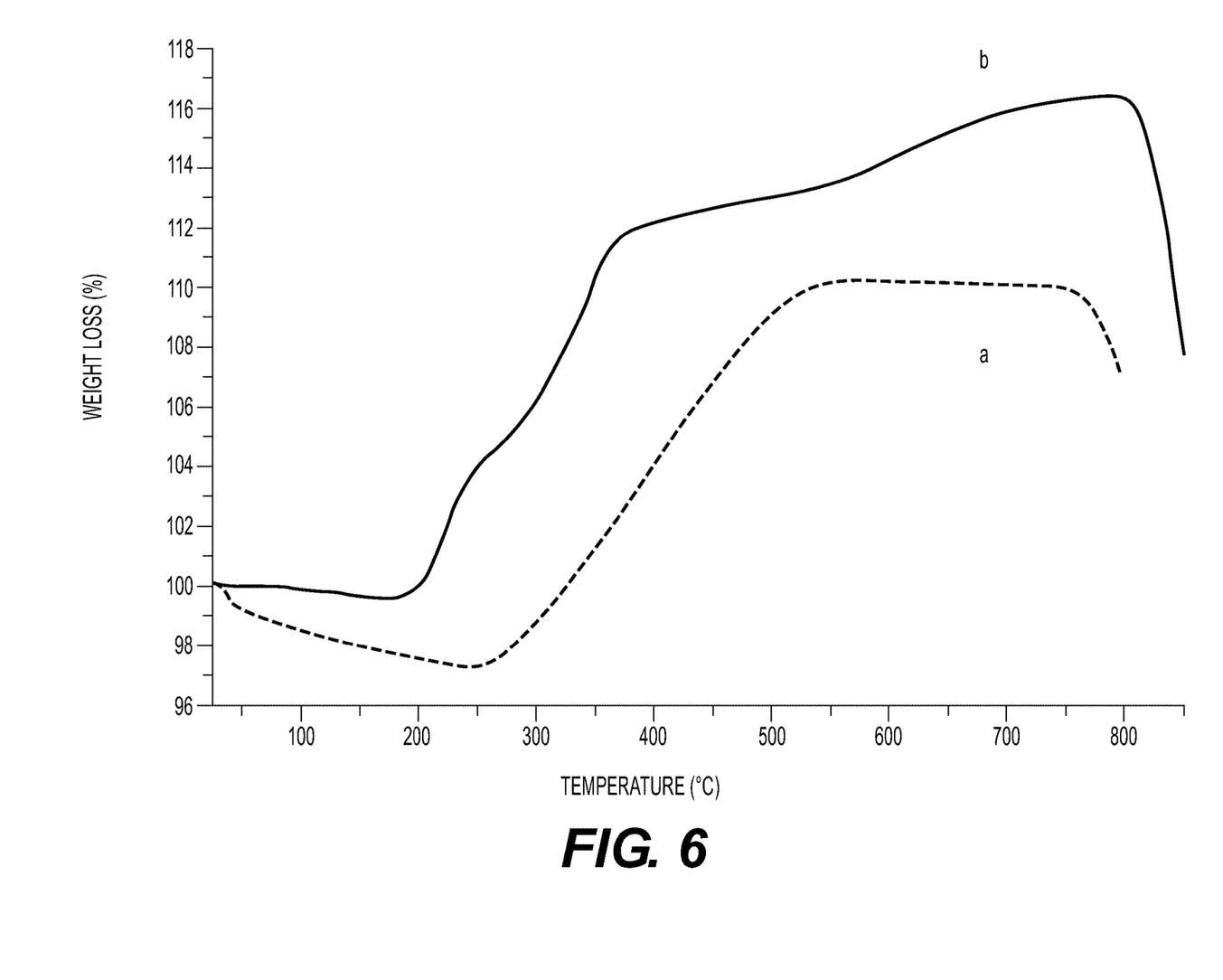
FIG. 6 is a thermogravimetric analysis (TGA) plot showing a TGA curve (curve a) for carbon-coated copper nanoparticles prepared according to the present method compared to a TG curve (curve b) for pure copper nanoparticles.

Thermal stability of the prepared C-coated Cu powders was investigated by thermogravimetric analyses and compared with the commercial copper nanoparticles. The analysis was conducted under nitrogen atmosphere with a heating rate of 10° C./min, and the results are shown in FIG. 6. FIG. 6 shows that the weight of the commercial copper nanoparticles started to increase before 197° C. because of the oxidation of Cu. In the case of the prepared C-coated copper, the weight started to increase after 246° C.

Figure 7:
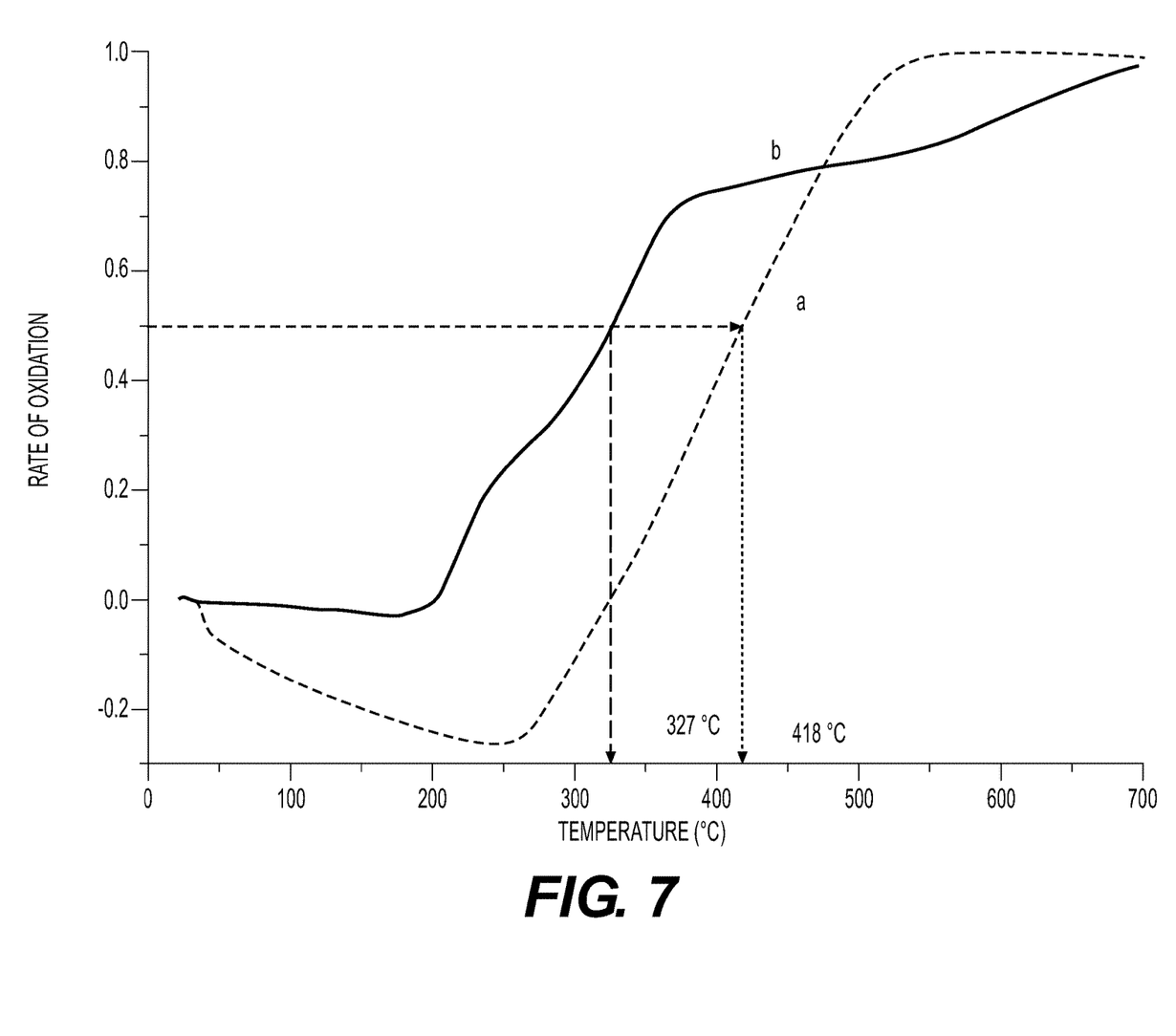
FIG. 7 is a plot comparing TGA curves after oxidation at 540° C. for carbon-coated copper nanoparticles prepared according to the present method (curve a) compared to pure copper nanoparticles (curve b).

To make a more detailed comparison on the thermal stability as a degree of Cu oxidation, the weight changes in TGA were normalized with each weight of powders at 540° C., where all the Cu in each sample was entirely oxidized (see FIG. 7). Therefore, the ratio of the oxidation in FIG. 7 presents the degree of Cu oxidation. It is clearly noticed that the presence of carbon layers retards the oxidation of Cu. For example, comparing the temperatures at which 50% of Cu is oxidized, it was 327° C. and 418° C. for the pure copper nanoparticles and the C-coated copper, respectively.

To determine the content of the carbon layers, the initial mass loss, which is assigned to the decomposition of carbon, can be calculated by comparison with that of the pure copper nanoparticles. Based on the TGA results of the pure copper nanoparticles, the difference between the mass losses of the prepared C-coated Cu and the pure Cu reveals the content of carbon layers in the prepared copper. It was 1.2 wt %.

Thus, the method for making carbon-coated copper nanoparticles described herein provides a simple, efficient, and economical one-step method for preparing carbon-coated copper nanoparticles.

It is to be understood that the method for making carbon-coated copper nanoparticles is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for making carbon-coated copper nanoparticles, comprising the step of heating copper hydroxide nitrate ($Cu_2(OH)_3(NO_3)$) mixed with ethanol under conditions including a temperature of 300° C. and a pressure of 120 bar, for two hours.

2. The method for making carbon-coated copper nanoparticles according to claim 1, wherein said heating step is performed in the presence of an inert gas.

3. The method for making carton-coated copper nanoparticles according to claim 2, wherein said heating step is performed in the presence of argon.

4. The method for making carbon-coated copper nanoparticles according to claim 3, wherein after performing said heating step, the method further comprises releasing the pressure in the presence of the argon gas.

5. The method for making carbon-coated copper nanoparticles according to claim 4, wherein after releasing the pressure, the method further comprises collecting the resulting carbon-coated copper nanoparticles in air.

6. The method for making carbon-coated copper nanoparticles according to claim 2, wherein after performing said heating step, the method further comprises releasing the pressure in the presence of the inert gas.

7. The method for making carbon-coated copper nanoparticles according to claim 6, wherein after releasing the pressure, the method further comprises collecting the resulting carbon-coated copper nanoparticles in air.

* * * * *